(12) United States Patent
Aoki et al.

(10) Patent No.: US 8,096,380 B2
(45) Date of Patent: Jan. 17, 2012

(54) TRANSFER ROBOT

(75) Inventors: Sota Aoki, Toyota (JP); Koji Tomida, Okazaki (JP); Shinji Tohyama, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 301 days.

(21) Appl. No.: 12/530,858

(22) PCT Filed: Mar. 3, 2008

(86) PCT No.: PCT/JP2008/054228
§ 371 (c)(1),
(2), (4) Date: Sep. 11, 2009

(87) PCT Pub. No.: WO2008/114630
PCT Pub. Date: Sep. 25, 2008

(65) Prior Publication Data
US 2010/0101357 A1  Apr. 29, 2010

(30) Foreign Application Priority Data
Mar. 19, 2007  (JP) .................. 2007-070057

(51) Int. Cl.
*B62D 1/24* (2006.01)
*B60P 1/00* (2006.01)
*B66C 23/18* (2006.01)
(52) U.S. Cl. ............ 180/167; 414/435; 414/744.2
(58) Field of Classification Search .......... 180/167; 414/435, 744.2
See application file for complete search history.

(56) References Cited

U.S. PATENT DOCUMENTS

| 4,637,775 A | * | 1/1987 | Kato ...................... 414/744.2 |
| 4,764,077 A | * | 8/1988 | Susnjara ................ 414/222.03 |
| 4,993,896 A | * | 2/1991 | Dombrowski et al. ....... 409/138 |
| 5,271,686 A | * | 12/1993 | Herring et al. ............. 403/229 |
| 6,554,991 B1 | * | 4/2003 | Goodman et al. ........... 204/613 |
| 6,634,851 B1 | * | 10/2003 | Bonora et al. ............. 414/744.3 |
| 6,655,901 B2 | * | 12/2003 | Tsubota et al. ............ 414/744.5 |
| 7,790,499 B2 | * | 9/2010 | Sato et al. ................. 438/106 |
| 7,942,619 B2 | * | 5/2011 | Hashimoto et al. .......... 414/217 |

FOREIGN PATENT DOCUMENTS

JP  6-143162  5/1994
(Continued)

OTHER PUBLICATIONS

Notice of Reason for Rejection for JP Appl. No. 2007-070057 dated Jan. 25, 2011.

*Primary Examiner* — Paul N Dickson
*Assistant Examiner* — Marlon Arce
(74) *Attorney, Agent, or Firm* — Finnegan, Henderson, Farabow, Garrett & Dunner, LLP

(57) ABSTRACT

A transfer robot that is safe and produced at low cost is provided. A transfer robot (100) includes a base (7) fixable to a floor surface, a link mechanism provided on the base (7), an arm rotatably attached to the base (7) by the link mechanism, casters attached to a lower surface of the arm and used to move the arm, and a holding section provided on an upper surface of the arm to hold a carriage (13). The link mechanism includes a motor, a first reduction mechanism rotated by the motor, and a second reduction mechanism coupled to the first reduction mechanism and rotating the arm.

7 Claims, 12 Drawing Sheets

FOREIGN PATENT DOCUMENTS

| | | |
|---|---|---|
| JP | 8-118267 | 5/1996 |
| JP | 8-336784 | 12/1996 |
| JP | 09-029671 | 2/1997 |
| JP | 11-33949 | 2/1999 |
| JP | 2005-131715 | 5/2005 |
| JP | 3115497 | 9/2005 |
| JP | 2006-167864 | 6/2006 |

* cited by examiner

TRANSFER ROBOT

CROSS-REFERENCE TO RELATED APPLICATIONS

This application is a national phase application of International application No. PCT/JP2008/054228, filed Mar. 3, 2008, and claims the priority of Japanese application No. 2007-070057, filed Mar. 19, 2007, the contents of both of which are incorporated herein by reference.

TECHNICAL FIELD

The present invention relates to a transfer robot to transfer a transfer object such as a carriage on a plane surface without lifting it.

BACKGROUND ART

FIGS. 12 and 13 are diagrams showing conventional transfer robots. FIGS. 12 and 13 show a vertical articulated robot and a horizontal articulated robot, respectively. A vertical articulated robot 200 includes a base 201 that is fixed to a floor surface, a supporting section 202 that is attached to the base 201 through a link mechanism (not shown), a first arm 204 that is rotatably attached to the supporting section 202 by a link mechanism 203 in a vertical direction, a second arm that is rotatably attached to the first arm 204 by a link mechanism 205 in a vertical direction, a holding section 208 that is rotatably attached to the second arm by a link mechanism 207 in a vertical direction, and a pin 209 that is attached to the holding section 208. Rotation of the link mechanisms 203, 205, and 207 moves the first arm 204, the second arm 206, and the holding section 208 in a vertical direction. Further, the supporting section 202 is rotated in a horizontal direction by a link mechanism that is provided between the base 201 and the supporting section 202.

Further, a horizontal articulated robot 300 includes a base 301 that is fixed to a floor surface, a link mechanism 302 that is attached to the base 301, a first arm 303 that is rotatably attached by the link mechanism 302 in a horizontal direction, a second arm 306 that is rotatably attached to the first arm 303 by a link mechanism 305 in a horizontal direction, a hose 304 including an electric line that is connected to the second arm 306, and a cylinder 307 that is provided in the second arm 306 and moves up and down in a vertical direction. Rotation of the link mechanisms 302, 305 moves the first arm 303 and the second arm 306 in a horizontal direction. As such a transfer robot that transfers a transfer object in a horizontal direction, a transfer robot disclosed in a patent document 1 is known to the public.

[Patent Document 1]
Japanese Utility Model No. 3115497

DISCLOSURE OF INVENTION

Technical Problem

However, when a transfer object is transferred with being lifted with the conventional robot that transfers the transfer object, a large-scale arm with a high-output motor is required. However, in a case of the transfer object such as a carriage that moves on a plane surface, the carriage needs to be maneuvered to a great number of places, and thus, it is needed to form a robot having high power and extremely wide operating area in transferring these transfer objects.

For example, a carriage that is employed in a manufacturing line such as an assembly line is 50 to 300 kg. When a worker transfers the carriage instead of using a robot, the work man-hour increases as the carriage needs to be maneuvered to a large number of places. In short, a labor cost that is spent for maneuvering a carriage is extremely high. On the other hand, in the conventional transfer robot that transfers such a carriage or the like, a large-scale arm having a high-output motor is required in transferring the transfer object with lifting it. However, a robot, which transfers such a carriage or the like, having extremely large operating area and high output includes a high-output motor, which requires execution of security measures such as a fence, occupies large space due to its large size, and even leads to process division or degradation of line prediction. Further, an equipment cost is extremely high.

The present invention has been made in order to solve such problems, and it is one object of the present invention to provide a transfer robot that is safe and produced at low cost.

Technical Solution

A transfer robot according to the present invention includes a base, a link mechanism provided on the base, a first arm attached to the base by the link mechanism so as to rotate in a horizontal direction, a caster attached to a lower surface of the first arm and used to move the first arm around the link mechanism, and a holding section provided on an upper surface of the first arm to hold a transfer object. The link mechanism includes a motor, a first reduction mechanism that controls rotation by the motor, and a second reduction mechanism coupled to the first reduction mechanism and controlling rotation of the first arm.

According to the present invention, the transfer object is transferred by supporting deadweight of the robot by attaching the caster to the lower surface of the first arm and rotating the arm in a horizontal direction by the link mechanism, whereby a motor having lower output may be employed.

Further, the transfer robot may include one or a plurality of second arms attached to a position between the base and the first arm by a link mechanism so as to rotate in a horizontal direction. By inserting one or a plurality of second arms, transfer range of the robot can be arbitrarily set.

Furthermore, the transfer robot may further include a caster that is attached to a lower surface of the second arm, the caster supporting deadweight of the second arm.

Furthermore, the link mechanism in the base side has a higher gear ratio of the second reduction mechanism to the first reduction mechanism than the link mechanism in the first arm side. As a load torque in the base side is larger, the gear ratio in the base side can be made larger in accordance with it.

Further, the holding section may include a pin that fits a held section provided in the transfer object, and is able to transfer the transfer object by fixing it with the pin.

Furthermore, the holding section includes a cylinder that holds the pin, and the pin is configured to be movable in a direction that is apart from the first arm, which is a vertical or a horizontal direction, for example. The position of the holding section may vary according to the height of the transfer object or the like.

Advantageous Effects

According to the present invention, it is possible to provide a transfer robot that is safe and produced at low cost.

EXPLANATION OF REFERENCE 2a, 2b LINK SECTION
3 DISTAL END LINK SECTION
4 HOLDING SECTION
5a~5d MOTOR
6a~6d FIRST REDUCTION MECHANISM
7 BASE
8b~8e SECOND REDUCTION MECHANISM
9b~9d ARM
10b~10d, 13b CASTER
11 CYLINDER
12a, 12b PIN
12c SUPPORTING SECTION
13 CARRIAGE
13a BODY
14a, 14b HELD SECTION
15, 16, 17 POSITION
100 TRANSFER ROBOT

BEST MODE FOR CARRYING OUT THE INVENTION

Figure 1:
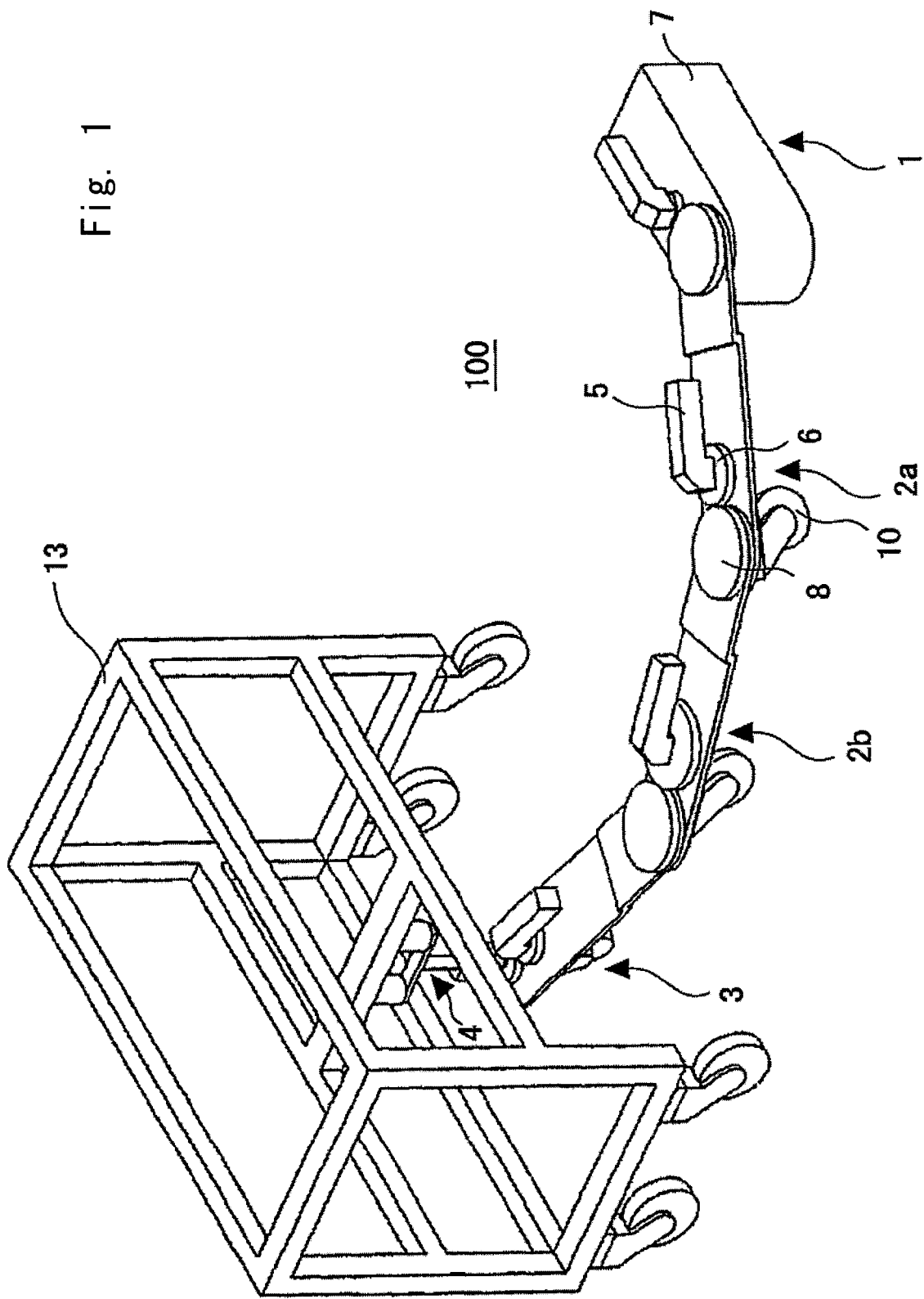
FIG. 1 is a perspective view showing a transfer robot according to an embodiment of the present invention.
Figure 2:
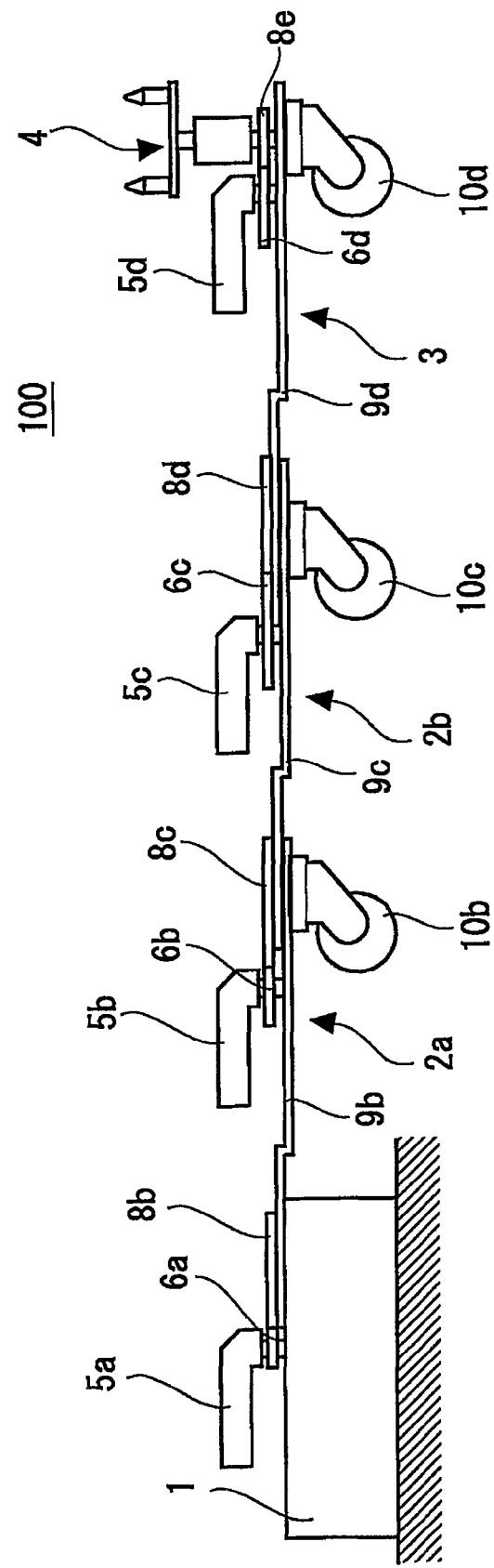
FIG. 2 is a side view showing the transfer robot according to the embodiment of the present invention.
Figure 3:
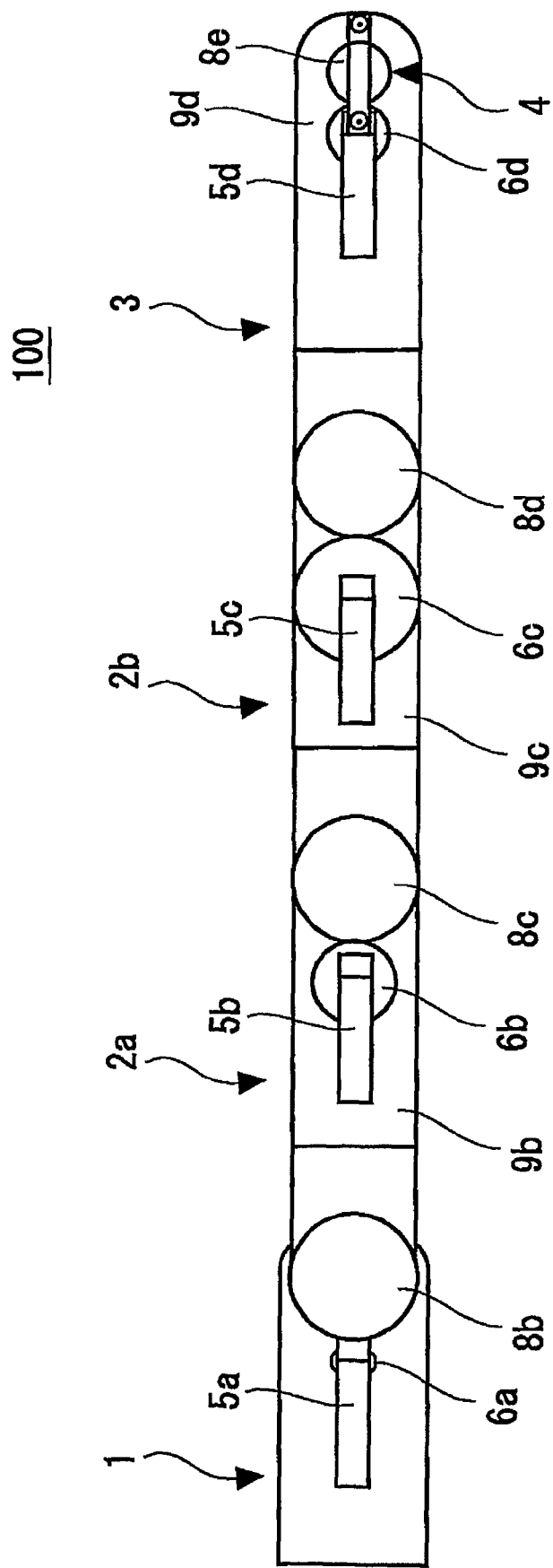
FIG. 3 is a plane view showing the transfer robot according to the embodiment of the present invention.

Hereinafter, the specific embodiment to which the present invention is applied will be described in detail with reference to the drawings. FIGS. 1 to 3 respectively show a perspective view, a side view, and a plane view showing a transfer robot according to the embodiment of the present invention. A transfer robot 100 according to the present embodiment includes a base section 1, link sections 2a, 2b, a distal end link section 3, and a holding section 4. The base section 1 is fixed to a floor surface, and a carriage 13 is held by the holding section 4 provided in the distal end link section 3. Then, each rotation of the link sections 2a, 2b and the distal end link section 3 in a horizontal direction moves the carriage 13 in a horizontal direction.

Figure 4:
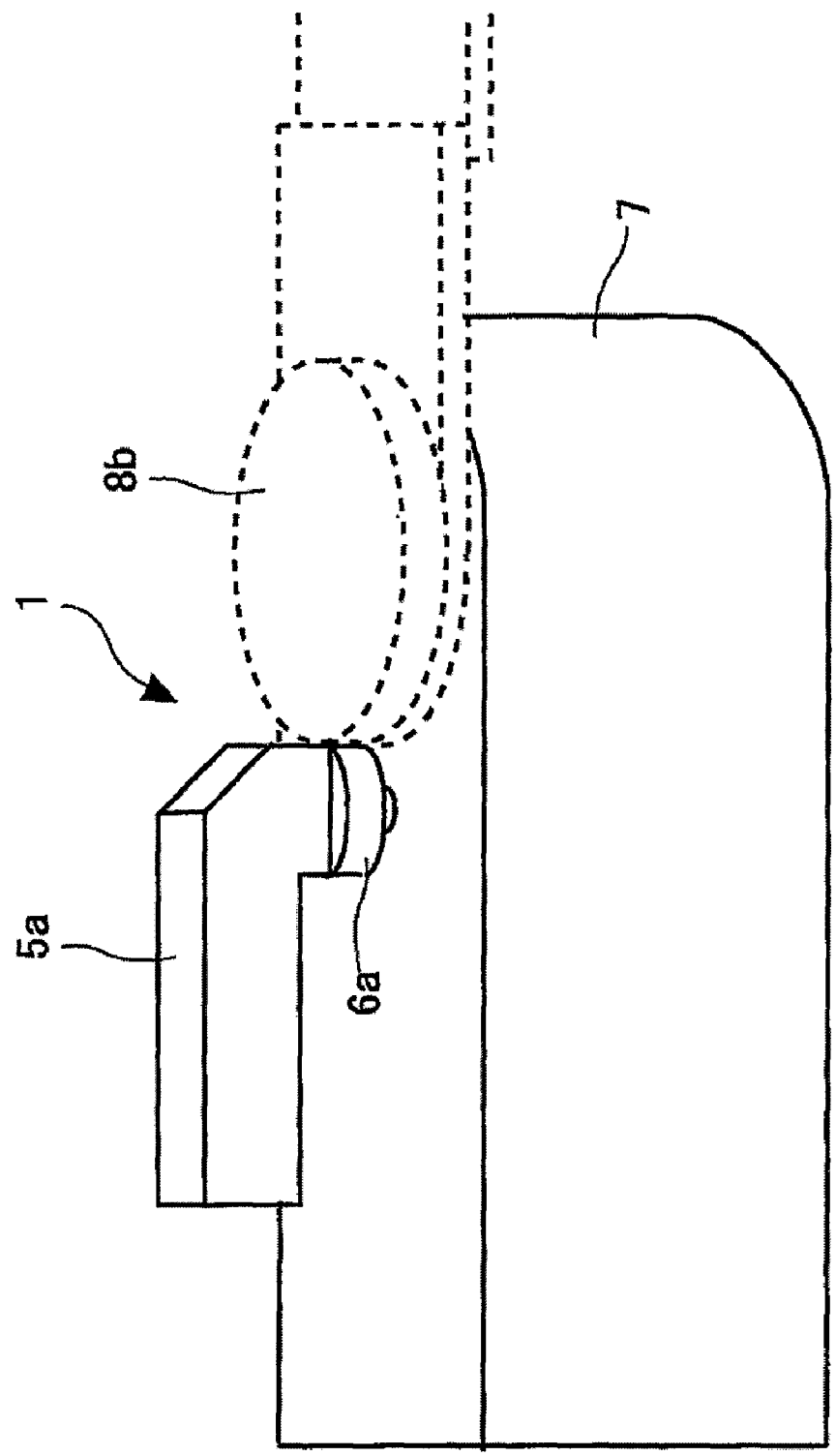
FIG. 4 is a perspective view showing a base section in the transfer robot according to the embodiment of the present invention.

FIGS. 4 to 7 are perspective views showing the base section 1, the link section 2a, the distal end link section 3, and the holding section 4, respectively. The base section 1 includes, as shown in FIG. 4, a motor 5a, a first reduction mechanism 6a that is attached to a distal end of the motor 5a and rotated about a vertical axis by the motor 5a, and a base 7 to which the first reduction mechanism 6a is attached. The transfer robot 100 according to the present embodiment is configured to move only in a two-dimensional manner, to thereby reduce the load of the motor 5a. For example, the motor 5a with low output as 80 W or lower may be employed.

Figure 5:
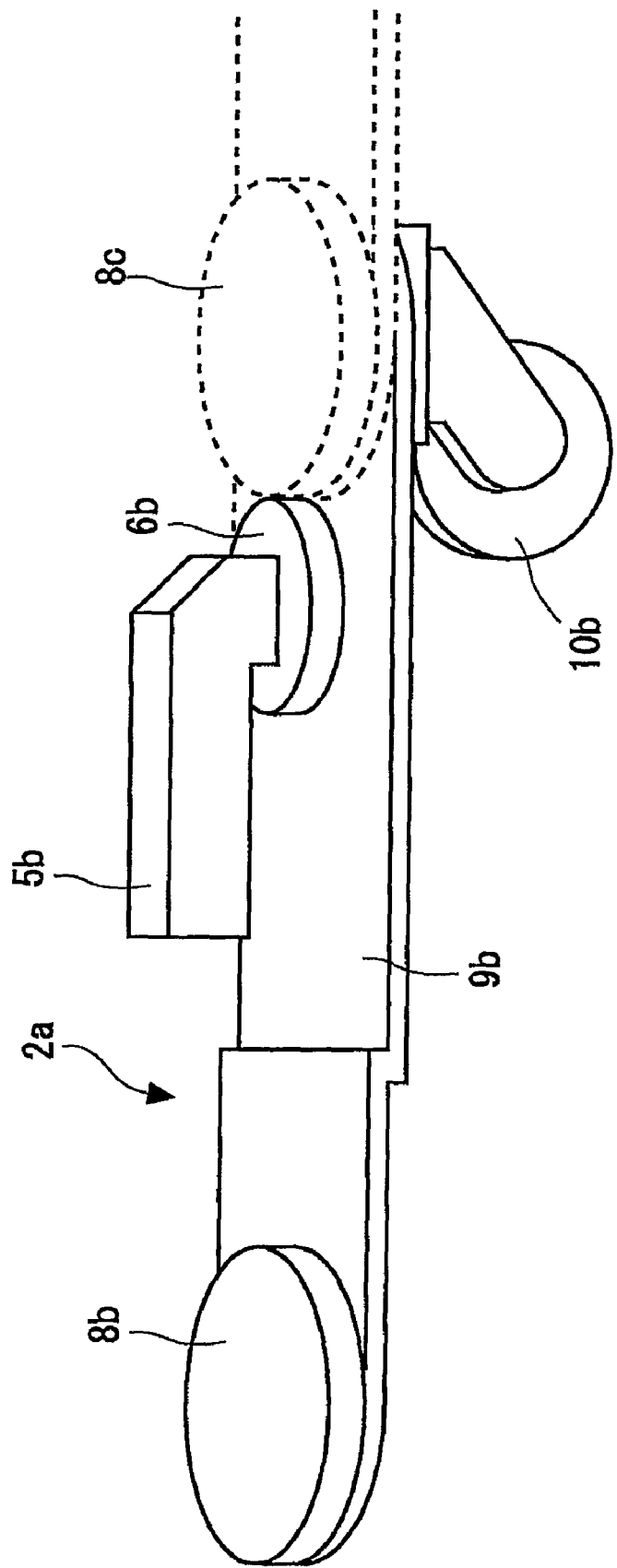
FIG. 5 is a perspective view showing a link section 2a in the transfer robot according to the embodiment of the present invention.

The link section 2a includes, as shown in FIG. 5, a second reduction mechanism 8b that is coupled to the first reduction mechanism 6a of the base section 1, an arm 9b as a second arm where the second reduction mechanism 8b is attached to its one end of the upper surface, a motor 5b, a first reduction mechanism 6b rotated by the motor 5b and provided in the other end of the arm 9b, and a caster 10b that is attached to a lower surface of the arm 9b to support and move the arm 9b. The first reduction mechanism and the second reduction mechanism are mechanisms that reduce rotation of the motor by combining a reducer, a gearbox, a gear wheel and so on. The second reduction mechanism 8b also rotates in a horizontal direction about the vertical axis similarly to the first reduction mechanism 6a. The link mechanism is formed by the motor 5a, the first reduction mechanism 6a, and the second reduction mechanism 8b.

The first reduction mechanism 6a of the base section 1 is rotated by the motor 5a, and thus the second reduction mechanism 8b that is coupled to the first reduction mechanism 6a is rotated. Although not shown in FIGS. 4 to 7, the first reduction mechanism 6a and the second reduction mechanism 8b are configured in a way that both gear wheels mesh together. The rotation of the second reduction mechanism 8b rotates the arm 9b in a horizontal direction. The link section 2b is formed similarly to the link section 2a.

Figure 6:
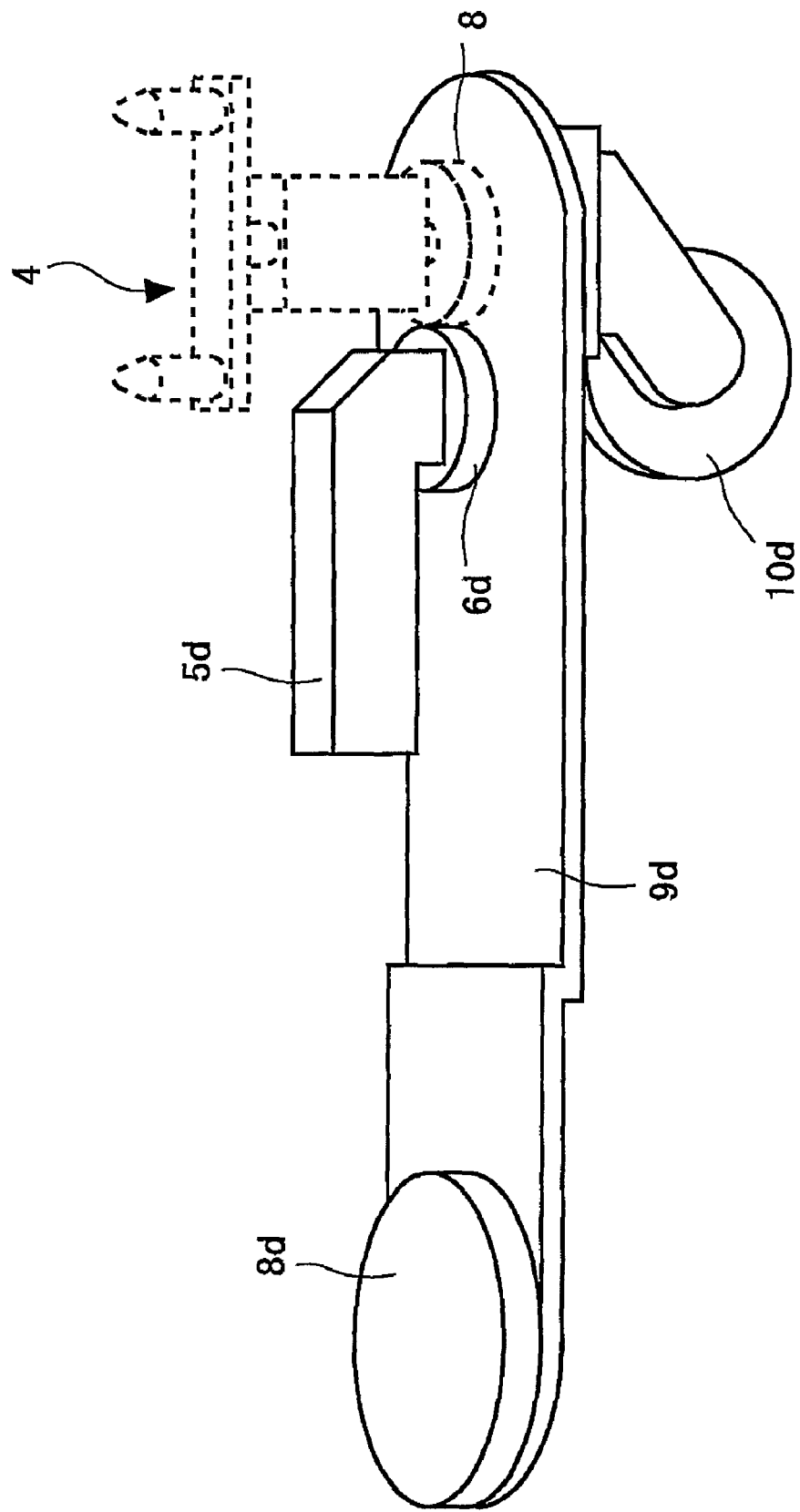
FIG. 6 is a perspective view showing a distal end link section 3 in the transfer robot according to the embodiment of the present invention.

The distal end link section 3 includes, as shown in FIG. 6, a second reduction mechanism 8d, an arm 9d as a first arm where the second reduction mechanism 8d is attached to its one end of the upper surface, a motor 5d, a first reduction mechanism 6d rotated by the motor 5d, and a caster 10d that is attached to the lower surface of the arm 9d to support and move the arm 9d. The distal end link section 3 includes the holding section 4 that is connected to the first reduction mechanism 6d.

Figure 7:
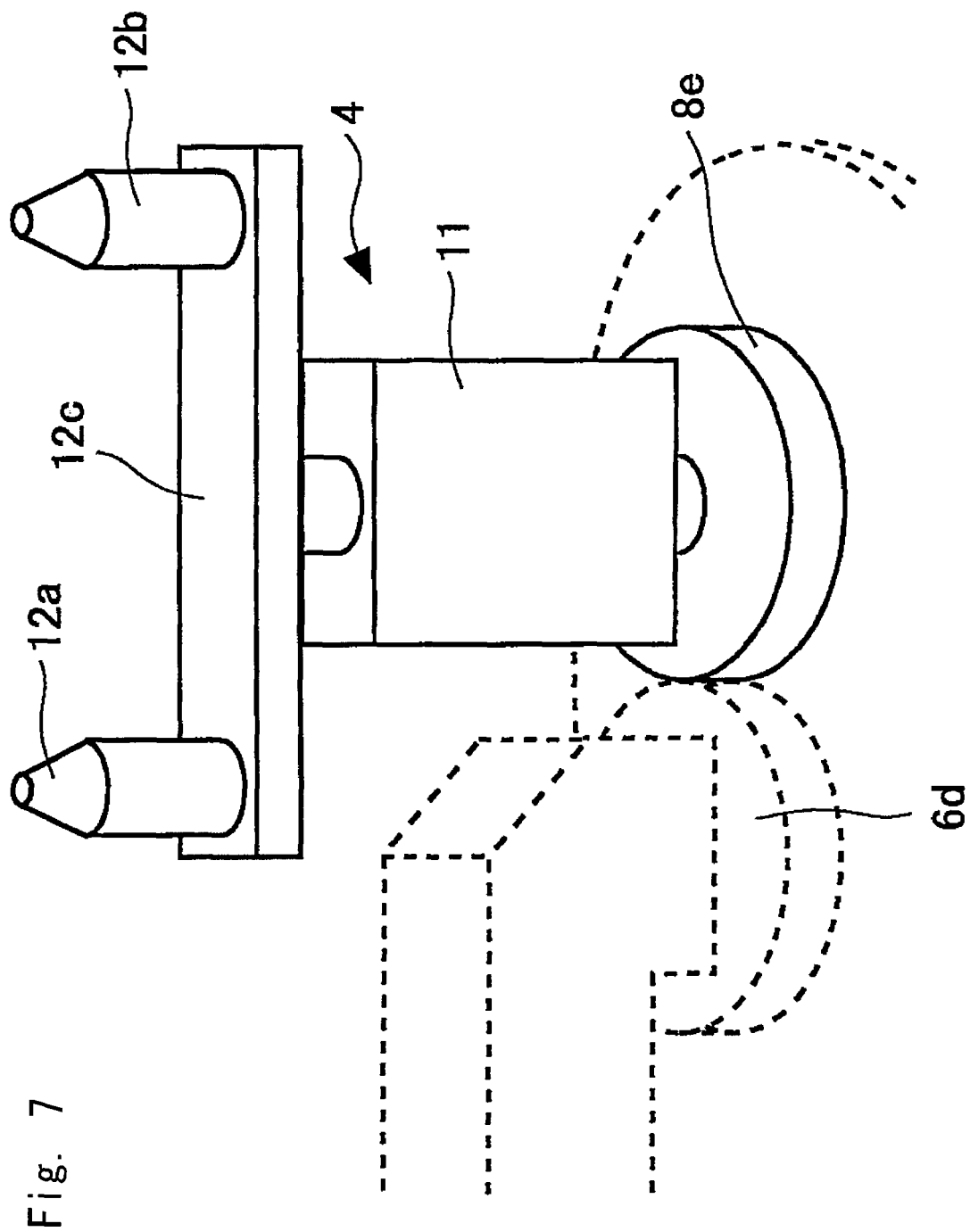
FIG. 7 is a perspective view showing a holding section 4 in the transfer robot according to the embodiment of the present invention.

The holding section 4 includes, as shown in FIG. 7, a second reduction mechanism 8e that is coupled to the first reduction mechanism 6d, a cylinder 11 that is rotated by the second reduction mechanism 8e, a supporting section 12c having a flat plate shape that moves up and down in a vertical direction by the cylinder 11, and pins 12a and 12b each of which being provided in one of two ends of the supporting section 12c. The first reduction mechanism 6d is rotated by the motor 5d, and thus, the second reduction mechanism 8e is rotated. Then, the rotation of the cylinder 11 attached to the second reduction mechanism 8e changes the positions of the pins 12a and 12b. Although the pins 12a and 12b are described to move in a vertical direction by the cylinder 11 in the holding section 4 in the present embodiment, the pins 12a and 12b may be adapted to move in a horizontal direction by the cylinder 11. Alternatively, the pins 12a and 12b may be configured to move in any direction to be apart from the distal end link section 3 depending on the method of attaching the cylinder 11, not only in the horizontal direction or the vertical direction.

Now, the load torque increases as approaching a base side, or the base section 1 side. Accordingly, each gear ratio of the second reduction mechanisms 8b to 8e to the first reduction mechanisms 6a to 6d in each axis is formed to be higher as approaching the base section 1 side. In summary, the gear ratio of the second reduction mechanism 8b to the first reduction mechanism 6a is larger than that of the second reduction mechanism 8c to the first reduction mechanism 6b, and the gear ratio of the second reduction mechanism 8c to the first reduction mechanism 6b is larger than that of the second reduction mechanism 8d to the first reduction mechanism 6c.

Figure 8A:
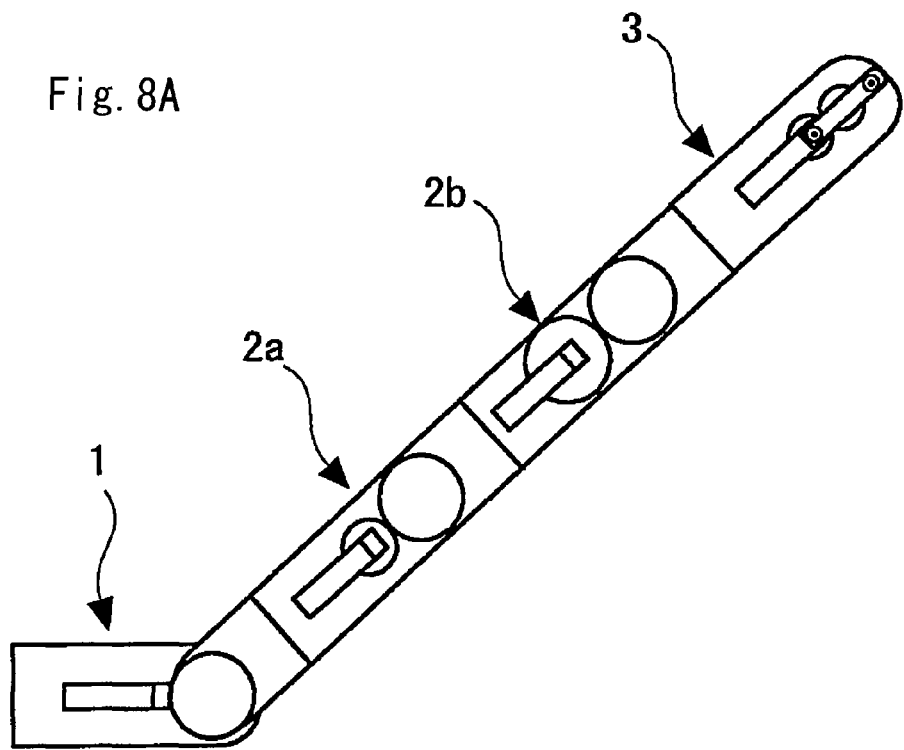
FIG. 8A is a plane view showing a first state in which a motor of the transfer robot is driven and each joint (link mechanism) is bent according to the embodiment of the present invention.
Figure 8B:
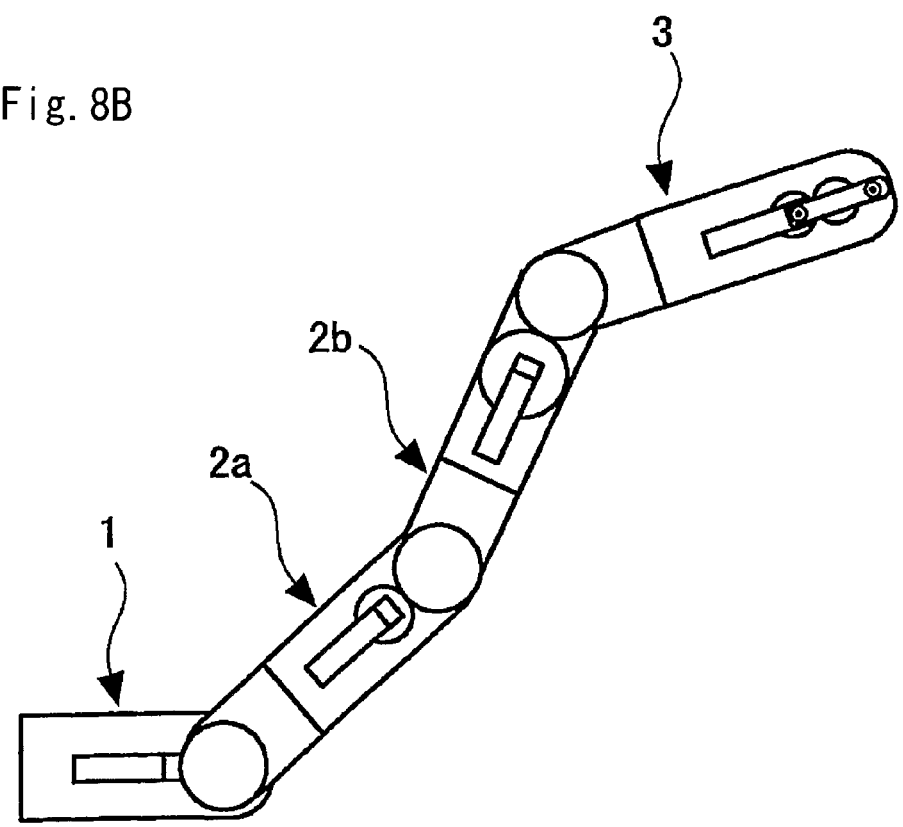
FIG. 8B is a plane view showing a second state in which a motor of the transfer robot is driven and each joint (link mechanism) is bent according to the embodiment of the present invention.

FIGS. 8A and 8B are plane views respectively showing a first state and a second state in which the motors of the transfer robot are driven and each joint (link mechanism) is bent. FIG. 8A shows a state in which the motor 5a of the base section 1 is driven and the first reduction mechanism 6a and the second reduction mechanism 8b are rotated. FIG. 8B shows a state in which the motors 5b and 5c are driven further from the state shown in FIG. 8A to rotate the first reduction mechanisms 6b, 6c and the second reduction mechanisms 8c, 8d. Each of the motors 5a to 5d includes an encoder therein, and controls an angle of each joint when the angle is given. Note that, in the present embodiment, a straight-line state as shown in FIG. 2 corresponds to zero degree of the encoder.

Figure 9:
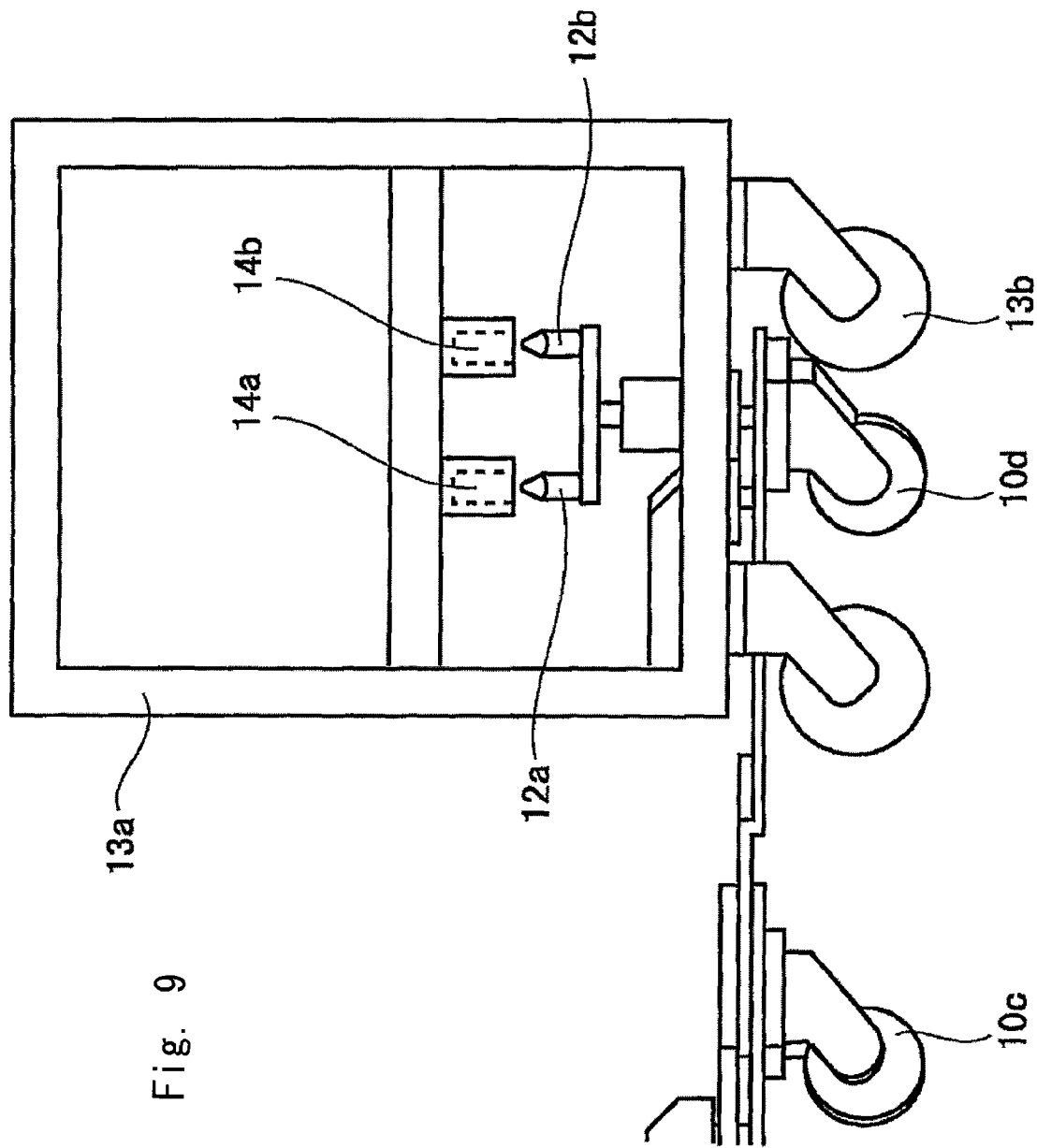
FIG. 9 is a diagram showing a carriage as a transfer object and a holding section in the transfer robot according to the embodiment of the present invention.

FIG. 9 is a diagram showing the carriage as the transfer object and the holding section. As shown in FIG. 9, the carriage 13 includes held sections 14a and 14b that incorporate the pins 12a and 12b of the holding section 4. The carriage 13 is configured to be able to carry a load and move on a floor surface with a body 13a and four casters 13b that support and move the body 13a. The carriage 13 is fixed by inserting the pins 12a and 12b of the holding section 4 into the held sections 14a and 14b of the carriage 13.

Figure 10:
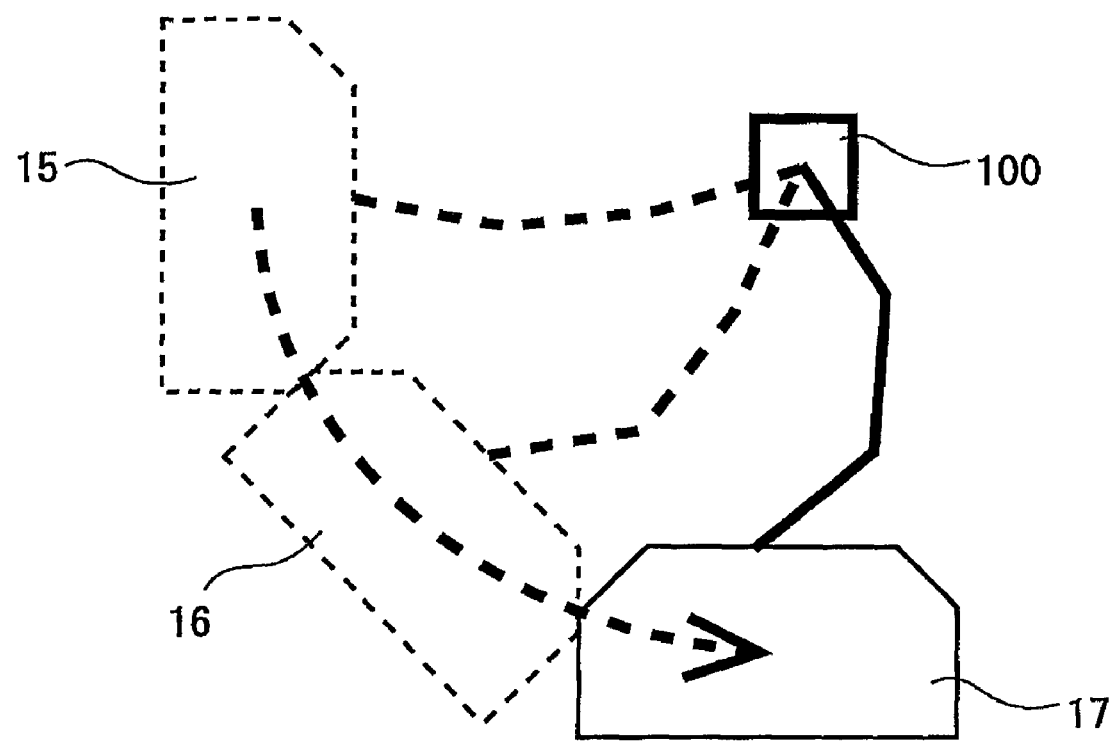
FIG. 10 is a diagram showing an operation example of the transfer robot according to the embodiment of the present invention.
Figure 11A:
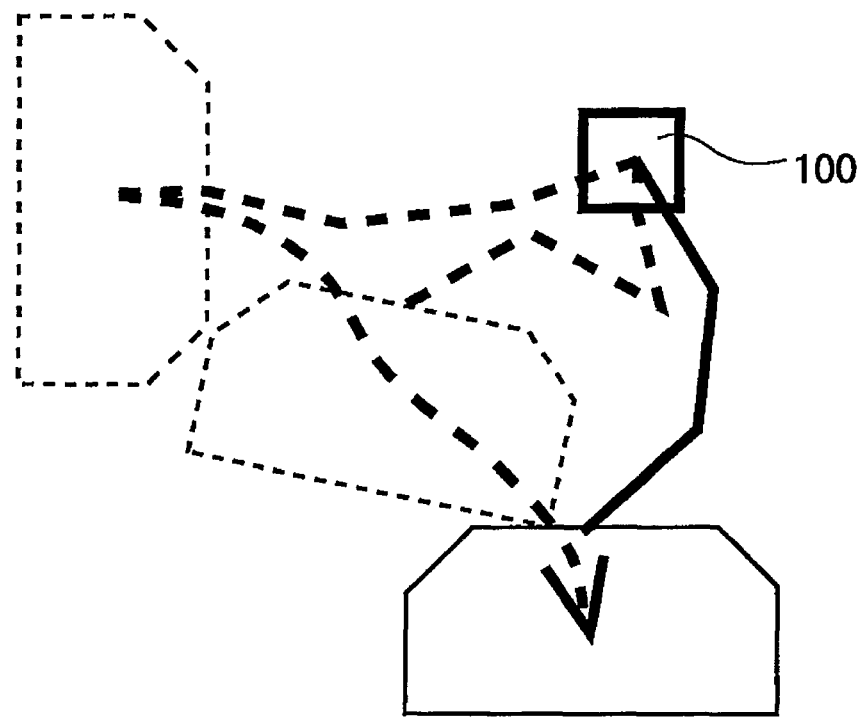
FIG. 11A is a diagram showing an operation example of the transfer robot according to the embodiment of the present invention.
Figure 11B:
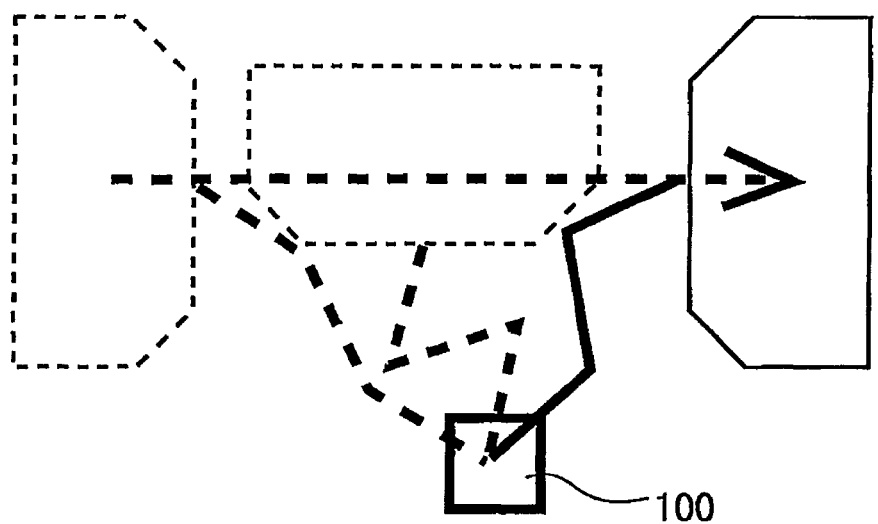
FIG. 11B is a diagram showing an operation example of the transfer robot according to the embodiment of the present invention.
Figure 12:
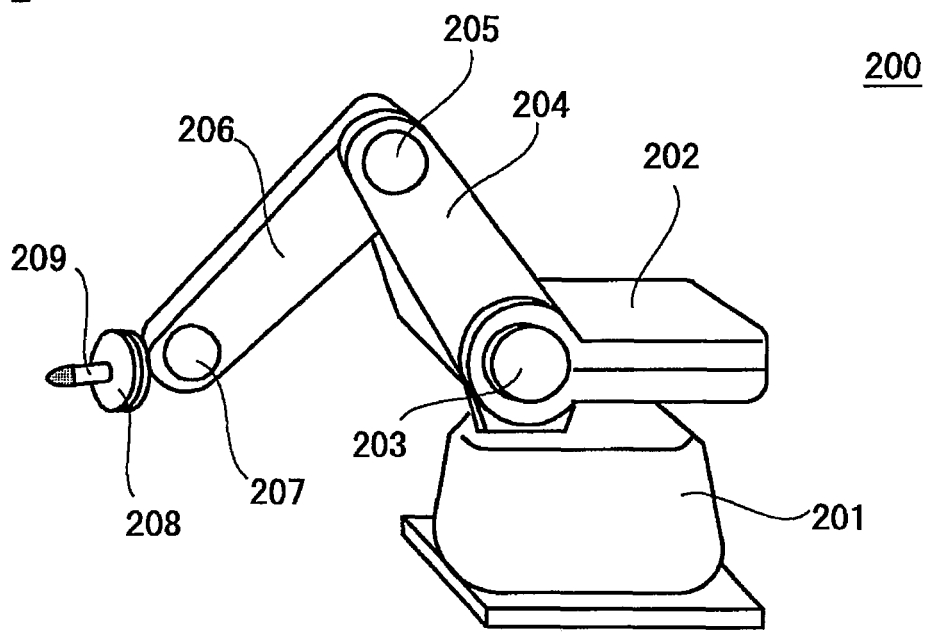
FIG. 12 is a diagram showing a conventional vertical articulated transfer robot.
Figure 13:
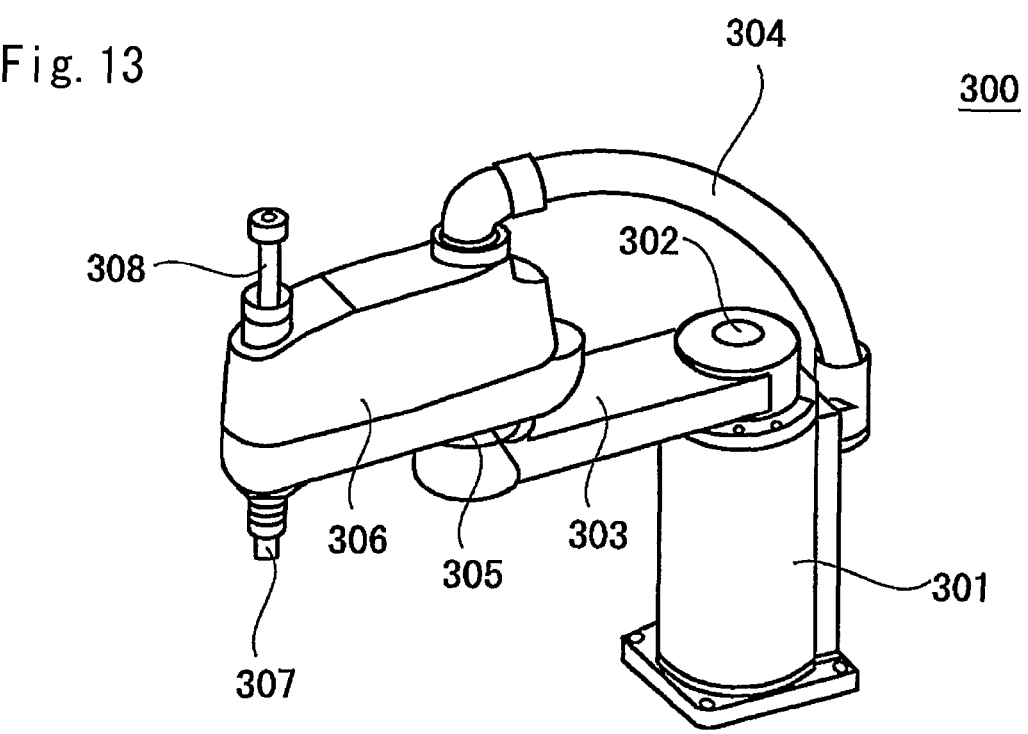
FIG. 13 is a diagram showing a conventional horizontal articulated transfer robot.

FIGS. 10, 11A, and 11B each shows an operation example of the transfer robot. As shown in FIG. 10, the transfer robot 100 moves the carriage from a position 15 to a position 17. First, the transfer robot 100 approaches the position 15 while storing the pins 12a and 12b, and inserts the pins 12a and 12b of the holding section 4 into the held sections 14a and 14b of the carriage 13 in a fixed position, so as to fix the carriage 13.

The transfer robot 100 moves toward the position 16 while controlling the angle and the speed by the motors 5a to 5d of each joint (link mechanism), and then to the position 17. When arriving at the position 17, the transfer robot 100 stores the pins 12a and 12b and separates the carriage 13. Then, the robot 100 again approaches the position 15 in order to transfer the next carriage, and repeats the aforementioned operation. The operations shown in FIGS. 11A and 11B are similar.

A conventional transfer robot holds a deadweight and a weight of a transfer object with a motor. As the transfer object is designed to be carried with being lifted, the robot itself needs to be rigid. This leads to increase of the deadweight.

On the other hand, in the present embodiment, the transferring is limited to flat transferring without lifting the transfer object, to thereby reducing the load required for transferring and making the operation of the robot two-dimensional. Further, the deadweight is supported by the casters in order to reduce the motor load by the deadweight. As such, the outputs of the motors 5a to 5d may be lowered to the extent that does not require any safety measures: 80 W, for example. Further, as the gear ratio of the second reduction mechanism to the first reduction mechanism is made larger as approaching the base section 1 side, whereby it is possible to withstand the load torque which is larger in the base section 1 side.

Further, as it is possible to employ a low-output motor, essentially safe configuration can be obtained, and the transfer robot may be introduced in a process where a worker is also involved. Further, transfer of a carriage or the like can be automated without wasting the space or impairing a line prediction or the like. Moreover, as transfer tracks can be arbitrarily set, it is possible to transfer a carriage in a way that does not interfere with a work traffic line in a process where the worker is also involved. Further, carriage transfer position can be readily changed only by changing teach points that indicates a start point, an end point, and a passing point of the operation. Furthermore, as the installation is completed only by fixing the base section 1 to the floor surface, installation works, process change or the like may be performed without holiday works or long-term works.

Needless to say, the present invention is not limited to the above embodiment, but various modifications can be made without departing from the spirit of the present invention. For example, although the two link sections 2a and 2b are provided in the present embodiment, the transfer robot may be composed of the base section 1 and the distal end link section 3 without providing any link section. Alternatively, one link section or three or more link sections may be provided. Further alternatively, the robot may be supported by the base section and the distal end link section depending on the lengths of the arm of the link section. In such a case, the caster of the link section need not be arranged.

INDUSTRIAL APPLICABILITY

The present invention is applicable to transfer robots to transfer a transfer object such as a carriage on the plane surface without lifting it.

The invention claimed is:

1. A transfer robot comprising:
a base;
a link mechanism that is provided on the base;
a first arm that is attached to the base by the link mechanism so as to rotate in a horizontal direction;
a caster attached to a lower surface of the first arm and used to support and move the first arm around the link mechanism;
a holding section provided on an upper surface of the first arm to hold a transfer object; and
a carriage held by the holding section without being lifted and transferred in a plane, wherein
the link mechanism comprises a motor, a first reduction mechanism that changes and transmits rotation by the motor, and a second reduction mechanism that is coupled to the first reduction mechanism and rotates the first arm.

2. The transfer robot according to claim 1, comprising one or a plurality of second arms that are attached to a position between the base and the first arm by a link mechanism so as to rotate in a horizontal direction.

3. The transfer robot according to claim 2, further comprising a caster that is attached to a lower surface of the second arm.

4. The transfer robot according to claim 2, wherein the link mechanism in the base side has a higher gear ratio of the second reduction mechanism to the first reduction mechanism than the link mechanism in the first arm side.

5. The transfer robot according to claim 1, wherein the holding section comprises a pin that fits a held section provided in the transfer object.

6. The transfer robot according to claim 5, wherein the holding section further comprises a cylinder that holds the pin, and the pin is configured to be movable in a direction that is apart from the first arm.

7. The transfer robot according to claim 5, wherein the holding section further comprises a cylinder that holds the pin, and the pin is configured to be movable in a horizontal or a vertical direction.

* * * * *